United States Patent
Asano et al.

(10) Patent No.: US 12,523,254 B2
(45) Date of Patent: Jan. 13, 2026

(54) HOLLOW STRUCTURE, BEARING MEMBER, AND METHOD FOR PRODUCING HOLLOW STRUCTURE

(71) Applicant: SINTOKOGIO, LTD., Nagoya (JP)

(72) Inventors: Norihiro Asano, Nagoya (JP); Norihito Fujiwara, Toyokawa (JP)

(73) Assignee: SINTOKOGIO, LTD., Aichi (JP)

( * ) Notice: Subject to any disclaimer, the term of this patent is extended or adjusted under 35 U.S.C. 154(b) by 182 days.

(21) Appl. No.: 18/333,792

(22) Filed: Jun. 13, 2023

(65) Prior Publication Data
US 2024/0011528 A1    Jan. 11, 2024

(30) Foreign Application Priority Data
Jul. 6, 2022    (JP) .................... 2022-109177

(51) Int. Cl.
| | |
|---|---|
| *F16C 33/32* | (2006.01) |
| *B28B 1/00* | (2006.01) |
| *B33Y 10/00* | (2015.01) |
| *B33Y 80/00* | (2015.01) |

(52) U.S. Cl.
CPC .............. *F16C 33/32* (2013.01); *B28B 1/001* (2013.01); *B33Y 10/00* (2014.12); *B33Y 80/00* (2014.12); *F16C 2206/56* (2013.01); *F16C 2206/60* (2013.01); *F16C 2220/24* (2013.01)

(58) Field of Classification Search
CPC .... F16C 33/303; F16C 33/32; F16C 2206/56; F16C 2206/60; F16C 2220/24; B26B 1/001; B33Y 10/00; B33Y 80/00
See application file for complete search history.

(56) References Cited

U.S. PATENT DOCUMENTS

| | | | |
|---|---|---|---|
| 3,751,123 A | * | 8/1973 | Parker .................... F16C 33/32 |
| | | | 384/492 |
| 2017/0045088 A1 | * | 2/2017 | Gluck .................. F16C 41/007 |
| 2017/0182561 A1 | | 6/2017 | Scancarello et al. |
| 2018/0154439 A1 | | 6/2018 | Mark |
| 2021/0239160 A1 | | 8/2021 | Hollen et al. |

FOREIGN PATENT DOCUMENTS

| | | | |
|---|---|---|---|
| CN | 114 536 744 A | 5/2022 | |
| DE | 10 2016 221609 A1 | 5/2018 | |
| IT | 201700096171 A1 * | 2/2019 | |
| JP | 2002029822 A | 1/2002 | |
| WO | WO-2017032403 A1 * | 3/2017 | ............ F16C 33/363 |

OTHER PUBLICATIONS

Extended European Search Report for European Application No. 23180806.4 mailed Nov. 23, 2023.
European Office Action for European Application No. 23180806.4 mailed Feb. 5, 2025.

* cited by examiner

*Primary Examiner* — Phillip A Johnson
(74) *Attorney, Agent, or Firm* — Harness, Dickey & Pierce, P.L.C.

(57) ABSTRACT

A hollow structure is formed from ceramic. The hollow structure includes a main body part and a reinforcing part. The main body part has a spherical outer peripheral surface, and inside the main body part, a hollow is formed. The reinforcing part is formed integrally with the main body part on an inner peripheral surface of the main body part and reinforces the main body part.

7 Claims, 7 Drawing Sheets

HOLLOW STRUCTURE, BEARING MEMBER, AND METHOD FOR PRODUCING HOLLOW STRUCTURE

This Nonprovisional application claims priority under 35 U.S.C. § 119 on Patent Application No. 2022-109177 filed in Japan on Jul. 6, 2022, the entire contents of which are hereby incorporated by reference.

TECHNICAL FIELD

The present disclosure relates to a hollow structure that is formed from ceramic, a bearing member, and a method for producing the hollow structure.

BACKGROUND ART

Japanese Patent Application Publication, Tokukai, No. JP 2002-29822 discloses a bearing ball which is formed from ceramic and in which a hollow part is provided.

SUMMARY OF INVENTION

Technical Problem

In the bearing ball disclosed in Japanese Patent Application Publication, Tokukai, No. JP 2002-29822, reduction in weight is attempted by having a hollow inside the bearing ball. However, since the baring ball is hollow inside, there is a problem that strength of the bearing ball is poor.

An object of an aspect of the present disclosure is to provide a hollow structure, a bearing member, and a method for producing the hollow structure, each of which can achieve reduction in weight while ensuring strength.

Solution to Problem

A hollow structure in accordance with an aspect of the present disclosure is a hollow structure formed from ceramic, the hollow structure including: a main body part which has a spherical outer peripheral surface and in which a hollow is formed; and a reinforcing part which is formed integrally with the main body part on an inner peripheral surface of the main body part and which reinforces the main body part.

According to the above configuration, the main body part is hollow inside, and at the same time, is reinforced by the reinforcing part that is formed integrally with the main body part on the inner peripheral surface of the main body part. This makes it possible to achieve reduction in weight of the hollow structure while ensuring strength of the hollow structure.

A method for producing a hollow structure in accordance with an aspect of the present disclosure is a method for producing a hollow structure formed from ceramic. The hollow structure includes: a main body part in which a hollow is formed, and a reinforcing part which is formed integrally with the main body part on an inner peripheral surface of the main body part and which reinforces the main body part. In the method for producing the hollow structure, the hollow structure is produced by forming the main body part and the reinforcing part integrally with each other with use of a 3D printer.

The above-described method for producing the hollow structure makes it possible to easily form the main body part and the reinforcing part of the hollow structure integrally with each other with use of the 3D printer.

Advantageous Effects of Invention

According to the hollow structure in accordance with an aspect of the present disclosure, it is possible to achieve reduction in weight while ensuring strength.

DESCRIPTION OF EMBODIMENTS

Embodiment 1

The following description will discuss Embodiment 1 of the present disclosure, with reference to FIGS. 1 to 4.

[Configuration of Hollow Structure]

Figure 1:
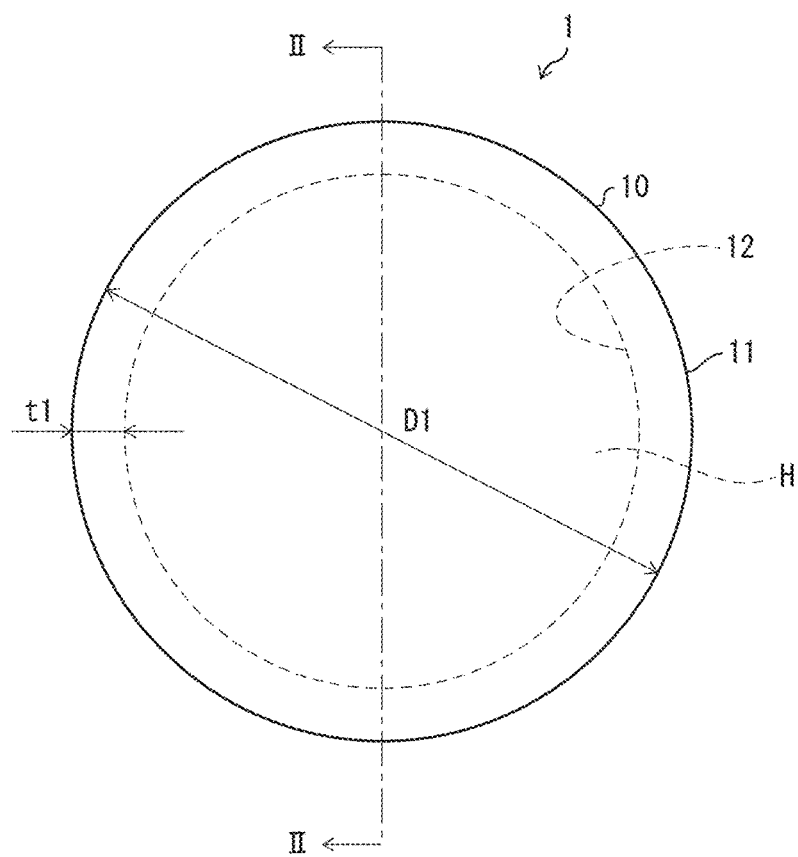
FIG. 1 is an external view of a hollow structure in accordance with Embodiment 1 of the present disclosure.
Figure 2:
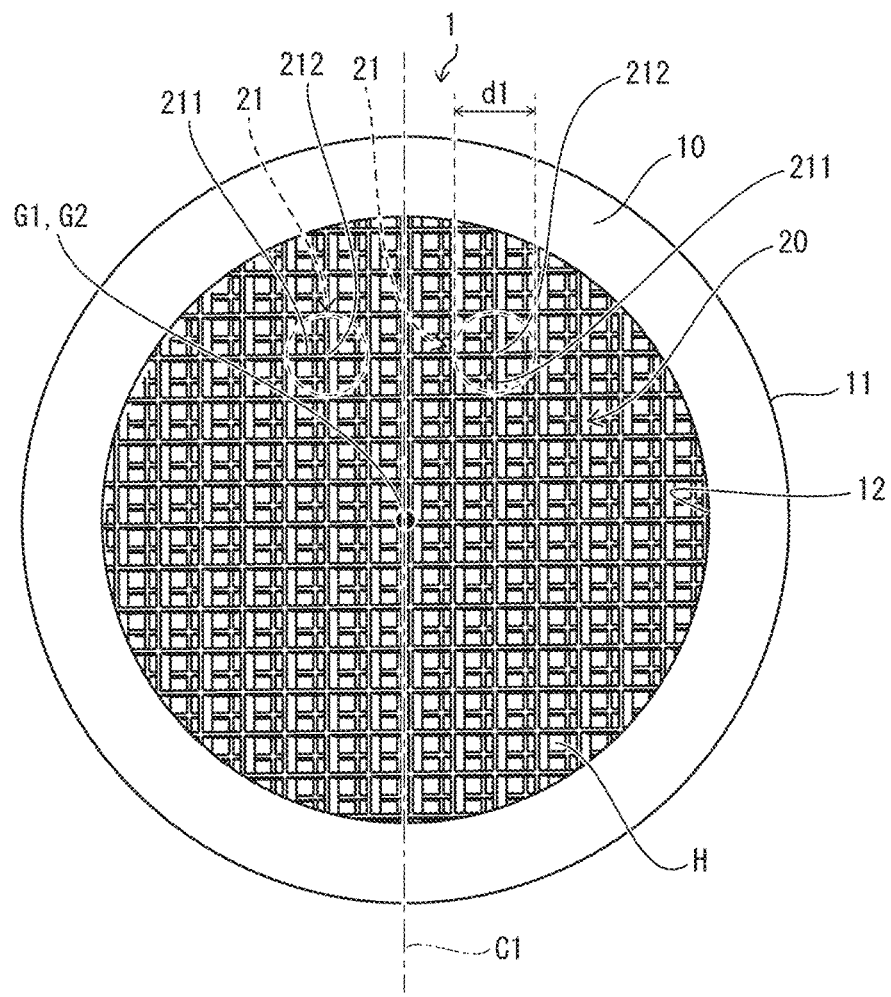
FIG. 2 is a cross sectional view illustrating an internal structure of the hollow structure as viewed along cutting plane line II-II of FIG. 1.

FIG. 1 is an external view of a hollow structure 1 in accordance with Embodiment 1. FIG. 2 is a cross sectional view illustrating an internal structure of the hollow structure 1 as viewed along cutting plane line II-II of FIG. 1. As illustrated in FIGS. 1 and 2, the hollow structure 1 is a spherical hollow member, and includes a main body part 10 and a reinforcing part 20.

As illustrated in FIG. 1, the main body part 10 has a spherical outer peripheral surface 11, and inside the main body part 10, a hollow H is formed. As illustrated in FIG. 2, the reinforcing part 20 is formed integrally with the main body part 10 on an inner peripheral surface 12 of the main body part 10. The reinforcing part 20 is a member for reinforcing the main body part 10.

The main body part 10 and the reinforcing part 20 are each formed from ceramic. The ceramic contains, for example, silicon nitride as a main component. The ceramic containing silicon nitride as a main component has high pressure resistance and high strength. Note that the ceramic for forming the main body part 10 and the reinforcing part 20 may contain, in place of silicon nitride, silicon carbide as a main component. Note that the ceramic does not necessarily contain silicon nitride and silicon carbide.

The reinforcing part 20 has a lattice structure, as illustrated in FIG. 2. The lattice structure is a structure in which a plurality of cells 21 in a lattice form are three-dimensionally and periodically stacked on top of each other. The reinforcing part 20 reinforces the main body part 10 by supporting, with use of the plurality of cells 21, the inner peripheral surface 12 of the main body part 10.

Each of the cells 21 is constituted by two columns 211 and a joint 212. The two columns 211 and the joint 212 are connected so as to form a cross shape when viewed from a front side of a sheet of drawing of FIG. 2. As the number of the cells 21 increases, strength of reinforcing the main body part by the reinforcing part 20 increases.

Further, it is possible to adjust the weight of a whole of the reinforcing part 20 by adjusting thickness, length, and/or the like of the columns 211 of the cell 21. Adjustment of the weight of the whole of the reinforcing part 20 makes it possible to adjust the weight of the whole of the hollow structure 1. The shape and the number of the cells 21 can be changed as appropriate depending on an intended use of the hollow structure 1.

The position of the center of gravity G2 of the reinforcing part 20 substantially coincides with the position of the center of gravity G1 of the main body part 10. Here, "substantially coincide" means that a positional difference between the center of gravity G1 of the main body part 10 and the center of gravity G2 of the reinforcing part 20 is within an allowable range within which no adverse effect occurs on rotational performance of the hollow structure 1.

Further, it is preferable that the reinforcing part 20 have a structure having plane symmetry with respect to a cutting surface C1 which passes through the center of gravity G1 of the main body part 10, in order to enhance the rotational performance of the hollow structure 1. Note that the reinforcing part 20 may be a structure having plane symmetry with respect to another cutting surface which passes through the center of gravity G1, such as a cutting surface which perpendicularly intersects with the cutting surface C1. The reinforcing part 20 only needs to have a structure having plane symmetry with respect to at least one cutting surface which passes through the center of gravity G1. The reinforcing part 20 may not have a structure having plane symmetry with respect to a cutting surface.

[Configuration of 3D Printer]

Figure 3:
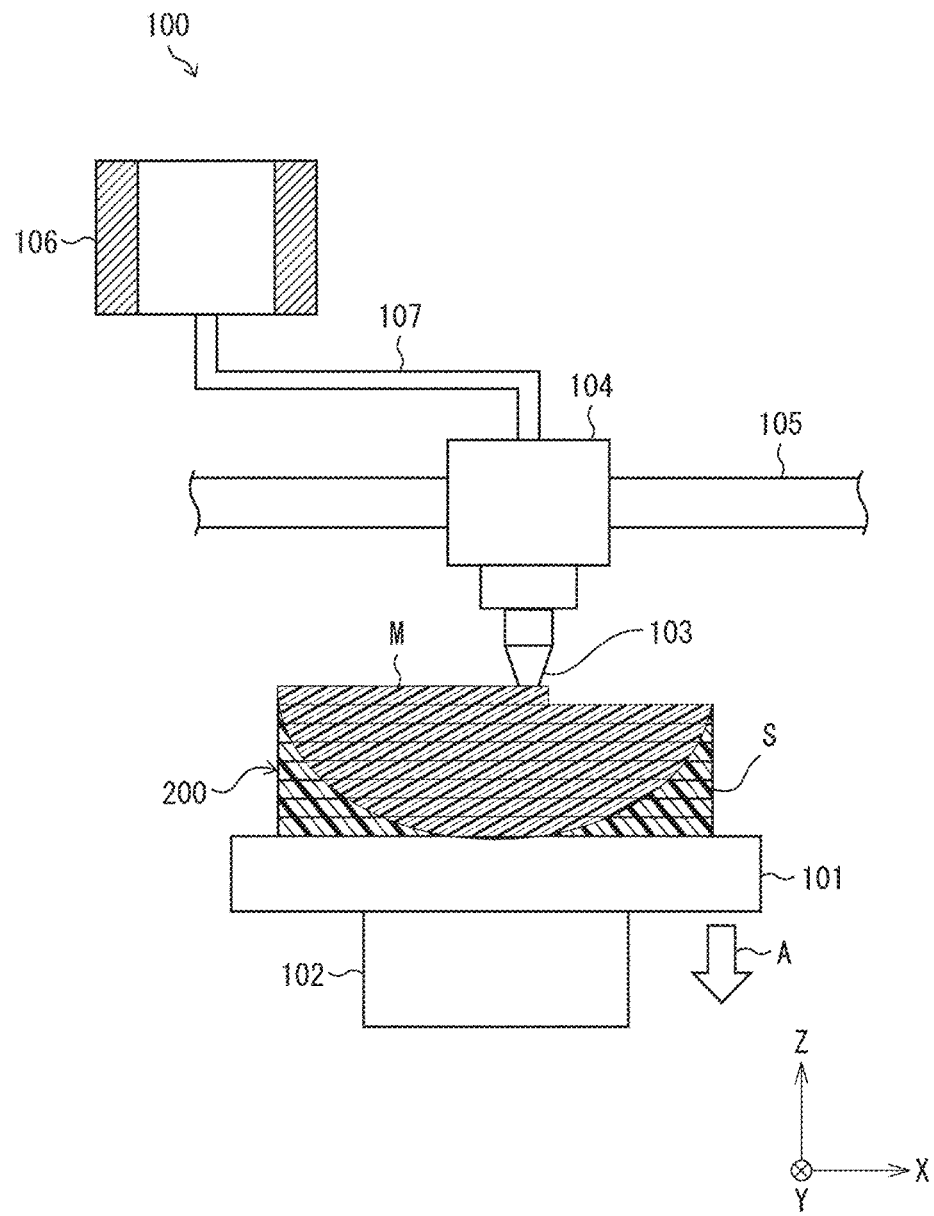
FIG. 3 is a diagram illustrating an example of a configuration of a 3D printer for producing the hollow structure in accordance with Embodiment 1.

FIG. 3 is a diagram illustrating an example of a configuration of a 3D printer 100 for shaping the hollow structure 1. The 3D printer 100 is a three-dimensional additive manufacturing device that shapes the hollow structure 1 having a three-dimensional shape. The 3D printer 100 shapes the hollow structure 1 by employing fused deposition modeling (FDM) (registered trademark).

The 3D printer 100 includes a platform 101, a drive shaft 102, a nozzle 103, a discharge head 104, a guide member 105, a material supply section 106 for supplying a material M, and a supply tube 107.

The platform 101 is a platform on which a structural object formed from the material M is to be placed. The drive shaft 102 moves the platform 101 in a Z-axis direction under control that is performed by a control device (not shown). The nozzle 103 is provided on a negative direction side of a Z axis with respect to the discharge head 104, and discharges, toward the platform 101, the material M that is in a dissolved state.

The discharge head 104 moves the nozzle 103 in an X-axis direction along the guide member 105 under control that is performed by the control device. The guide member 105 is configured to be capable of moving, under control that is performed by the control device, in a Y-axis direction along a pair of rails (not shown) that extends in the Y-axis direction. Note that the platform 101 may be configured to be capable of moving in the X-axis direction and the Y-axis direction.

The material supply section 106 supplies, to the discharge head 104 through the supply tube 107, the material M which is an elongated linear material. The control device controls the position of the nozzle 103 in the X-axis direction and the Y-axis direction while causing the material M that is filamentary to be discharged from the nozzle 103 that is provided to the discharge head 104. As a result, the structural object having a desired form is molded on the platform 101.

[Method for Producing Hollow Structure]

Figure 4:
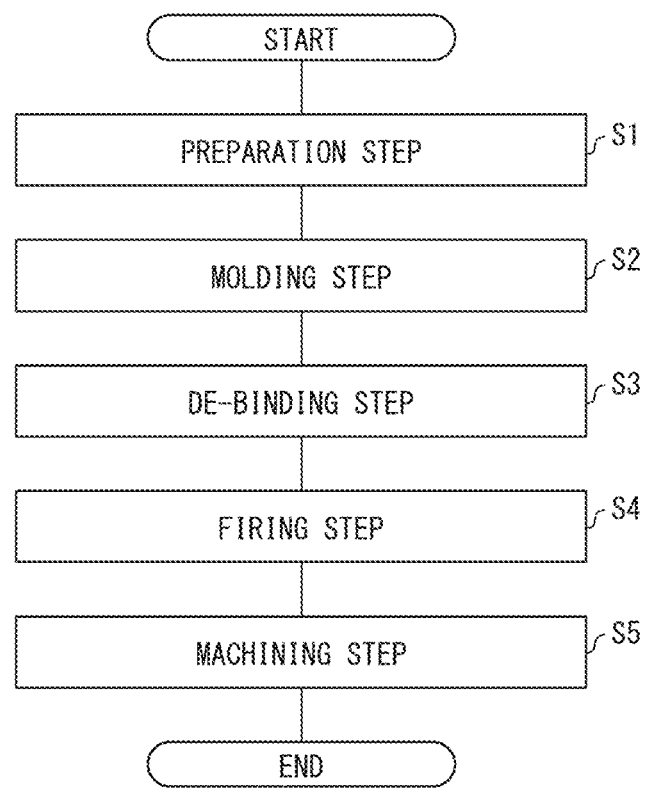
FIG. 4 is a flowchart showing a flow of a method for producing the hollow structure with use of the 3D printer in accordance with Embodiment 1.

Next, the following description will discuss a method for producing the hollow structure 1 with reference to a flowchart of FIG. 4. FIG. 4 is a flowchart showing a flow of the method for producing the hollow structure 1 with use of the 3D printer 100. As shown in FIG. 4, in the method for producing the hollow structure 1, a preparation step (S1), a molding step (S2), a de-binding step (S3), a firing step (S4), and a machining step (S5) are carried out in order. Each of these steps will be described in detail below.

<Preparation Step>

In the preparation step S1, first, a manufacturer of the hollow structure 1 creates, by an information processing device such as a personal computer (PC) (not illustrated), 3D data that is necessary for molding the hollow structure 1. In this case, the manufacturer employs three-dimensional computer aided design (CAD) or the like. Next, the manufacturer converts, with use of dedicated software by the information processing device, the 3D data thus created into stereolithography (STL) data in an STL format, which is a file format for the 3D printer 100.

Then, the manufacturer converts the STL data into slice data, with use of dedicated software by the information processing device. The slice data is cross section data in which the 3D data is sliced into a plurality of layers in a horizontal direction. The information processing device outputs, to the 3D printer 100, a group of pieces of the slice data thus obtained by conversion.

Note that it is assumed that the 3D data is designed in consideration of a shrinkage amount, a displacement amount, and/or the like of the material M in the firing step S4. Further, for example, an outer diameter D1 of the hollow structure 1, a wall thickness t1 of the main body part 10, and the number and an outer diameter d1 of the cells 21 of the reinforcing part 20, which are illustrated in FIGS. 1 and 2, can be set as appropriate depending on an intended use, a use condition, and/or the like of the hollow structure 1.

The manufacturer then prepares the material M that is to be used in production of the hollow structure 1. The material M is obtained by mixing, in a resin, ceramic at a predetermined ratio. The resin is made of, for example, a thermoplastic resin. As the thermoplastic resin, for example, an acrylonitrile butadiene styrene (ABS) resin, or a polylactic acid (PLA) resin can be used. Note that, for example, a wax and/or a plasticizer may be added to the material M.

<Molding Step>

Next, in the molding step S2, as illustrated in FIG. 3, in the 3D printer 100 that employs FDM, the material M that is filamentary and that is heated and dissolved at a predetermined temperature is discharged from the nozzle 103 to the platform 101. The 3D printer 100 controls the position of the nozzle 103 in the X-axis direction and the Y-axis direction on the basis of the slice data inputted, while discharging the material M from the nozzle 103. The 3D printer 100 thus carries out molding of one layer of the hollow structure 1.

Here, molding of one layer means molding of a portion corresponding to one piece of the slice data in which the 3D data of the hollow structure 1 is sliced into the plurality of layers in the horizontal direction. The slice data includes cross section data of the main body part 10 and/or the reinforcing part 20 that are constituted by corresponding layers.

Then, after molding of the one layer is completed, the 3D printer 100 controls the drive shaft 102 so as to move the platform 101 by one layer in the negative direction of the Z-axis as indicated by an arrow A. Then, the 3D printer 100 carries out molding of a next layer.

In this way, the 3D printer 100 stacks layers by repeating molding, layer by layer, the main body part 10 and/or the reinforcing part 20 constituted by each of the layers. The 3D printer 100 thus completes the hollow structure 1 in which the main body part 10 and the reinforcing part 20 are formed integrally with each other.

Note that in the molding, by the 3D printer 100, of the hollow structure 1 that is spherical, it is preferable to discharge the material M from the nozzle 103 in a state in which the hollow structure 1 is supported by a support member 200, as illustrated in FIG. 3. In this case, it is assumed that a support material S is discharged from the nozzle 103 before molding of the hollow structure 1 by the 3D printer 100, so that the support member 200 is molded in advance at a predetermined position on the platform 101.

As the support material S, it is preferable to use the same material as the material M, but a material different from the material M may be used. For example, by using a water-soluble material such as polyvinyl alcohol (PVA) as the supporting material S, the support member 200 can be removed without applying force to the hollow structure 1. The support member 200 may be molded in a shape that allows the support member 200 to be easily peeled off later. For example, the support member 200 may be provided with a plurality of protrusions and depressions on a surface that abuts on the material M.

Note that the hollow structure 1 and the support member 200 may be simultaneously molded by the 3D printer 100. In this case, it is preferable that the 3D printer 100 be provided with a nozzle for discharging the support material S, separately from the nozzle 103 for discharging the material M. Further, after the support member 200 is molded by the nozzle for discharging the support material S, the hollow structure 1 may be molded by the nozzle 103.

<De-Binding Step>

With reference back to FIG. 4, in the de-binding step S3 after the molding step S2, the hollow structure 1 is removed from the platform 101 and then, the hollow structure 1 is heated by a de-binding furnace (not illustrated) at approximately 500° C. to 600° C. This causes transpiration of the resin that is contained in the material M. This makes it possible to remove only the resin from the material M that forms the hollow structure 1.

Note that in the material M, when the resin is removed from the material M, a void is generated in a place where the resin removed was present. The void is removed in the following firing step S4.

<Firing Step>

In the firing step S4, for example, in a case where the hollow structure 1 formed from ceramic containing silicon nitride as a main component is to be produced, the hollow structure 1 is fired at approximately 1700° C. to 1800° C. in a firing furnace (not illustrated). The void in the material M that constitutes the main body part 10 and the reinforcing part 20 described above is thus removed. After the firing step S4, the hollow structure 1 shrinks and has higher hardness since the void has been eliminated from inside the material M that constitutes the main body part 10 and the reinforcing part 20.

<Machining Process>

After the firing step S4, in the machining step S5, the support member 200 is removed from the hollow structure 1 by cutting or the like. Then, a surface of the hollow structure 1 from which the support member 200 has been removed is subjected to a post-treatment such as polishing. As a result, the hollow structure 1 is completed.

According to the hollow structure 1 described above, since the reinforcing part 20 is formed integrally on the inner peripheral surface of the main body part 10 in which the hollow H is formed, it is possible to achieve reduction in weight while ensuring the strength. In particular, since the reinforcing part 20 has the lattice structure in which the plurality of cells 21 in the lattice form are regularly arranged, the strength of the main body part 10 of the hollow structure 1 can be reliably improved.

Further, since the hollow structure 1 is formed from ceramic, it is possible to make the hollow structure 1 hardly rust, and at the same time, to improve heat resistance and durability of the hollow structure 1.

Further, since the position of the center of gravity G1 of the main body part 10 substantially coincides with the position of the center of gravity G2 of the reinforcing part 20, the hollow structure 1 does not become eccentric. This makes it possible to enhance the rotation performance of the hollow structure 1.

Further, since the reinforcing part 20 has a structure having plane symmetry with respect to the cutting surface C1 which passes through the center of gravity G1 of the main body part 10, it is possible to reduce position-dependent variation in strength of the main body part 10 in a circumferential direction.

Further, the reinforcing part 20 is configured such that, as the number of the cells 21 increases, the strength of reinforcing the main body part 10 by the reinforcing part 20 increases. Therefore, the strength of the hollow structure 1 can be easily changed by adjusting the number of the cells 21. For example, by reducing the size of the cells 21 and increasing the number of the cells 21, the strength of reinforcing the main body part 10 by the reinforcing part 20 can be improved.

Further, since the ceramic forming the hollow structure 1 contains silicon nitride as a main component, wear resistance of the hollow structure 1 can be increased and rigidity of the hollow structure 1 can be increased. Furthermore, since silicon nitride is a non-magnetic insulator, silicon nitride can exhibit a high effect on prevention of electrolytic corrosion. This makes it possible to improve the durability and load resistance of the hollow structure 1. Furthermore, since a density of silicon nitride is equal to or less than half a density of steel, it is possible to improve high-speed rotation performance of the hollow structure 1.

According to the method for producing the hollow structure 1 of Embodiment 1, the main body part 10 and the reinforcing part 20 are formed integrally with each other in the molding step (S2) with use of the 3D printer 100 that employs fused deposition modeling (FDM). This makes it possible to easily shape the hollow structure 1.

In particular, in a conventional production method such as press working, it has been difficult to shape a ceramic product having a complicated shape such as a lattice structure. However, use of the 3D printer 100 that employs FDM makes it possible to easily form the hollow structure 1 by forming the reinforcing part 20 having the lattice structure integrally with the main body part 10.

Furthermore, when the hollow structure 1 is molded with use of the 3D printer 100, the reinforcing part 20 is molded simultaneously with the main body part 10. Therefore, the inner peripheral surface 12 of the main body part 10 that is being molded can be supported by the reinforcing part 20 that is being molded. Therefore, the shape of the main body part that is being molded can be maintained in a desired shape without deforming or collapsing.

Furthermore, according to the method for producing the hollow structure 1 with use of the 3D printer 100 that employs FDM, the hollow structure 1 is heated at a predetermined temperature in the de-binding step (S3) after the molding step (S2). This makes it possible to easily remove only the resin from the main body part 10 and the reinforcing part 20 which are molded with the material M in which ceramic is mixed in the resin.

On the other hand, in the 3D printer that employs stereolithography, it is difficult to remove a molding material from inside of the hollow structure 1 after molding the hollow structure 1 that is spherical. Therefore, it is necessary to make a hole in the hollow structure 1 in order to remove the molding material. In contrast, in the case of molding with use of the 3D printer 100 that employs FDM, it is possible to carry out de-binding without making a hole in the hollow structure 1.

In addition, in the firing step (S4), the main body part and the reinforcing part 20 are fired, so that the hollow structure 1 shrinks. This makes it possible to remove, from inside the material M, the void in the material M that has been generated in the de-binding step S3. This makes it possible to produce a high-quality hollow structure 1 that is made of high-density ceramic.

Embodiment 2

Figure 5:
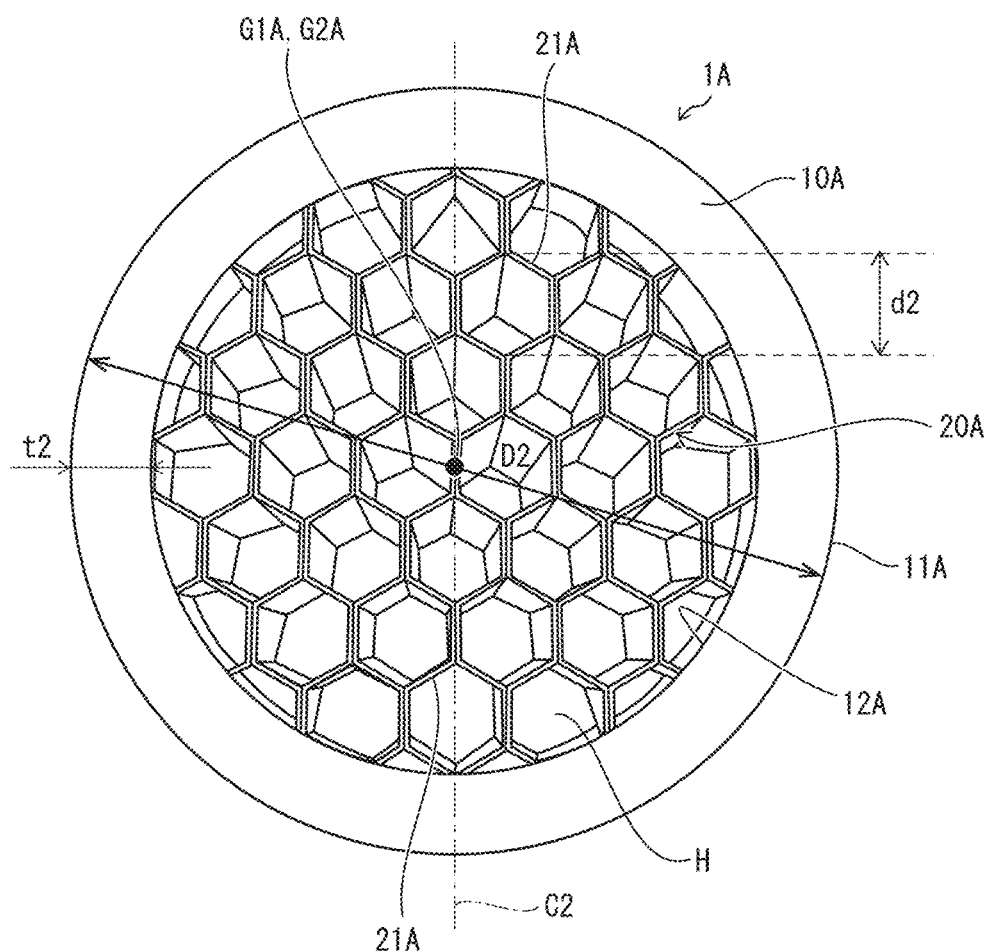
FIG. 5 is a view which illustrates an internal structure of a hollow structure in accordance of Embodiment 2 and which is equivalent to FIG. 2.

The following description will discuss a hollow structure 1A in accordance with Embodiment 2 of the present disclosure, with reference to FIG. 5. FIG. 5 is a view which illustrates an internal structure of the hollow structure 1A in accordance of Embodiment 2 and which is equivalent to FIG. 2. For convenience of description, members having functions identical to those described in Embodiment 1 above are assigned identical reference signs, and their descriptions are not repeated here.

As illustrated in FIG. 5, the hollow structure 1A of Embodiment 2 includes a main body part 10A and a reinforcing part 20A. The reinforcing part 20A has a honeycomb structure. The honeycomb structure has a structure in which a plurality of hexagonal prism-shaped cells 21A are regularly arranged.

The position of the center of gravity G2A of the reinforcing part 20A substantially coincides with the position of the center of gravity G1A of the main body part 10A. Further, it is preferable that the reinforcing part 20A have a structure having plane symmetry with respect to a cutting surface C2 which passes through the center of gravity G1A of the main body part 10A.

As in the method for producing the hollow structure 1 of Embodiment 1, in Embodiment 2, the hollow structure 1A is shaped with use of a 3D printer 100 that employs FDM. Further, for example, an outer diameter D2 of the hollow structure 1A, a wall thickness t2 of the main body part 10A, and the number and an outer diameter d2 of the cells 21A of the reinforcing part 20A can be set as appropriate depending on an intended use of the hollow structure 1A.

Even with use of the hollow structure 1A described above, it is possible to obtain the same effect as the hollow structure 1 of Embodiment 1. That is, strength of the main body part 10A of the hollow structure 1A can be improved by the reinforcing part 20A. At the same time, since the reinforcing part 20A has the honeycomb structure, it is possible to achieve reduction in weight of the hollow structure 1A.

In particular, in the hollow structure 1A of Embodiment 2, the reinforcing part 20A is made of a honeycomb structure in which a plurality of hexagonal prism-shaped cells 21A are regularly arranged. Therefore, the volume of a gap in each of the cells 21A increases. This allows the weight of a whole of the reinforcing part 20A to be reduced. Therefore, the weight of the whole of the hollow structure 1A can be reduced more than that of the hollow structure 1 of Embodiment 1.

The reinforcing part 20A has a honeycomb structure in which the plurality of hexagonal prism-shaped cells 21A are laid. Therefore, it is possible to easily disperse an external impact. Therefore, it is possible to improve impact absorption properties of the hollow structure 1A.

Embodiment 3

Figure 6:
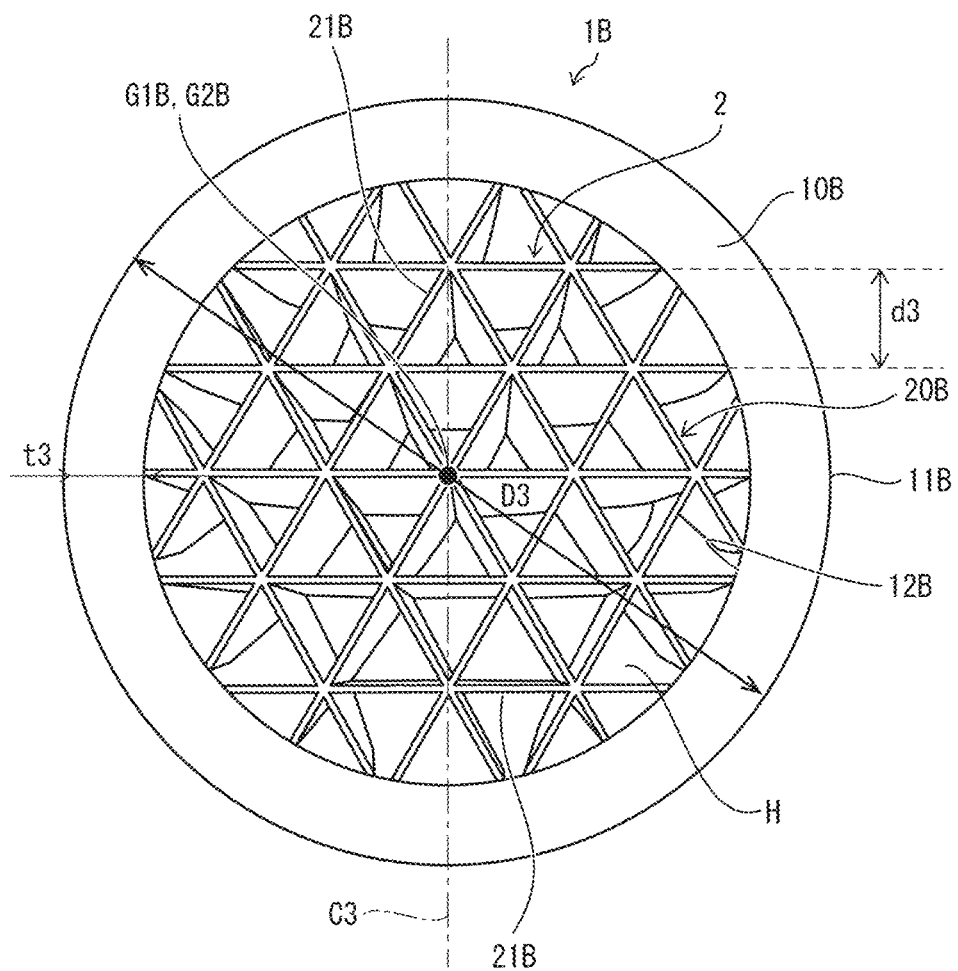
FIG. 6 is a view which illustrates an internal structure of a hollow structure in accordance of Embodiment 3 and which is equivalent to FIG. 2.

The following description will discuss a hollow structure 1B in accordance with Embodiment 3 of the present disclosure, with reference to FIG. 6. FIG. 6 is a view which illustrates an internal structure of the hollow structure 1B in accordance of Embodiment 3 and which is equivalent to FIG. 2. For convenience of description, members having functions identical to those described in Embodiment 1 above are assigned identical reference signs, and their descriptions are not repeated here.

As illustrated in FIG. 6, the hollow structure 1B of Embodiment 3 includes a main body part 10B and a reinforcing part 20B. The reinforcing part 20B has a honeycomb structure in which a plurality of triangular prism-shaped cells 21B are regularly arranged.

The position of the center of gravity G2B of the reinforcing part 20B substantially coincides with the position of the center of gravity G1B of the main body part 10B. Further, it is preferable that the reinforcing part 20B have a structure having plane symmetry with respect to a cutting surface C3 which passes through the center of gravity G1B of the main body part 10B.

As in the method for producing the hollow structure 1 of Embodiment 1, in Embodiment 3, the hollow structure 1B is shaped with use of a 3D printer 100 that employs FDM. Further, for example, an outer diameter D3 of the hollow structure 1B, a wall thickness t3 of the main body part 10B, and the number and an outer diameter d3 of the cells 21B of the reinforcing part 20B can be set as appropriate depending on an intended use of the hollow structure 1B.

Even with use of the hollow structure 1B described above, it is possible to obtain the same effect as the hollow structure 1 of Embodiment 1. That is, strength of the main body part 10B of the hollow structure 1B can be improved by the reinforcing part 20B. At the same time, since the reinforcing part 20B has a honeycomb structure, it is possible to achieve reduction in weight of the hollow structure 1B.

In particular, in the hollow structure 1B of Embodiment 3, the reinforcing part 20B is made of a honeycomb structure in which a plurality of triangular prism-shaped cells 21B are regularly arranged. Accordingly, unlike in the case of the reinforcing part 20 of Embodiment 1, there is no need to form a complicated lattice structure. Therefore, in Embodiment 3, unlike in the case of the hollow structure 1 of Embodiment 1, it is not necessary to control the position of the nozzle 103 in a complicated manner by the 3D printer 100. Therefore, the hollow structure 1B can be easily molded.

Further, the reinforcing part 20B of Embodiment 3 has a honeycomb structure in which a plurality of triangular prism-shaped cells 21B are laid. Therefore, the strength of the hollow structure 1B can be improved more than that of the reinforcing part 20A of Embodiment 2 which is configured by a honeycomb structure in which a plurality of hexagonal prism-shaped cells 21A are laid.

Other Embodiments

The reinforcing parts 20, 20A, and 20B of the above-described Embodiments 1 to 3 each have a lattice structure or a honeycomb structure, but the reinforcing part is not limited thereto. For example, the reinforcing part may have a rib structure. In this case, it is sufficient to have a configuration in which the main body part 10 is reinforced by providing a plurality of ribs in a projecting manner on an inner peripheral surface 12 of the main body part 10 of the hollow structure 1.

Further, the reinforcing parts 20A and 20B of Embodiments 2 and 3 have been each assumed to have a honeycomb structure in which a plurality of hexagonal prism cells 21 or triangular prism-shaped cells 21B are arranged, but the reinforcing part is not limited thereto. For example, the reinforcing part may have a honeycomb structure in which a plurality of quadrangular prism-shaped cells or octagonal prism-shaped cells are arranged.

In the above-described Embodiments 1 to 3, the 3D printer 100 is assumed to move the position of the nozzle 103 by controlling the drive shaft 102, the discharge head 104, and the guide member 105 with use of the control device. However, the 3D printer 100 is not limited thereto. For example, the position of the nozzle 103 may be moved by a manipulator that is made of an articulated robot.

Further, in the above-described Embodiments 1 to 3, the spherical hollow structures 1, 1A, and 1B that are spherical are each shaped by the 3D printer 100, but the embodiment of the present disclosure is not limited thereto. For example, a rectangular box-shaped hollow structure formed from ceramic may be shaped.

(Application Examples of Hollow Structure)

Figure 7:
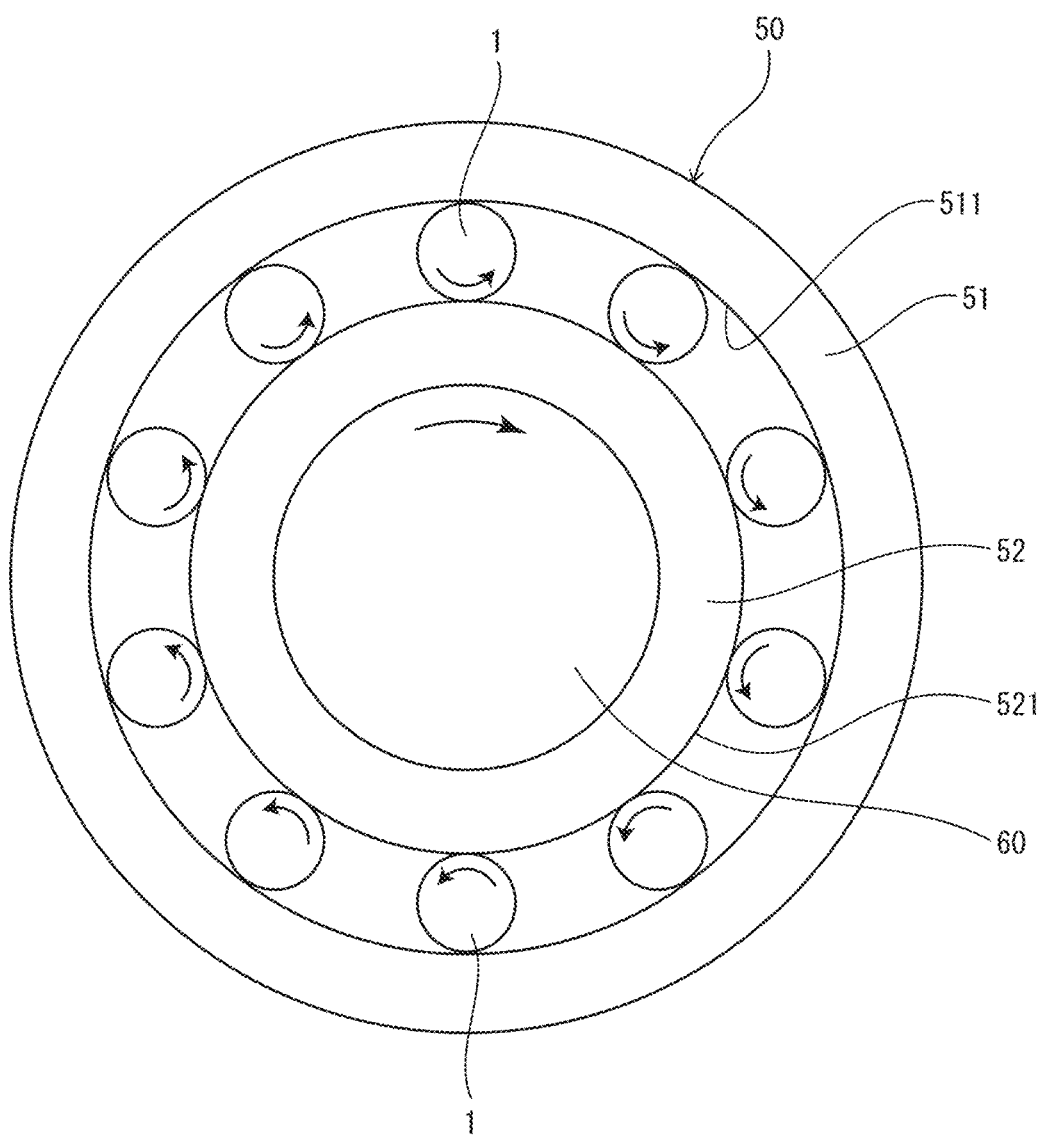
FIG. 7 is a cross sectional view illustrating an example in which the hollow structure in accordance with Embodiment 1 is applied to a bearing member.

Next, the following description will discuss an application example of the hollow structure 1 described above, with reference to FIG. 7. FIG. 7 is a cross sectional view illustrating an example in which the hollow structure 1 in accordance with Embodiment 1 is applied to a bearing member. As illustrated in FIG. 7, the hollow structure 1 can be used as rolling elements, that is, bearing balls, of a bearing 50 that is a bearing member. The bearing 50 is applied, for example, to a bearing member for a wind power generator.

The bearing 50 is a member for supporting a rotating shaft 60. The bearing 50 is a rolling bearing such as a deep groove ball bearing or an angular contact ball bearing. The bearing 50 is configured so as to include an outer ring 51, an inner ring 52, hollow structures 1 which are the bearing balls, and a cage (not illustrated).

A plurality of hollow structures 1 are disposed between a raceway surface 511 of the outer ring 51 and a raceway surface 521 of the inner ring 52. The cage holds the plurality of hollow structures 1 at intervals in a circumferential direction.

According to the bearing 50 which includes the hollow structures 1 described above, it is possible to achieve reduction in weight while ensuring strength of the hollow structures 1. Therefore, it is possible to improve the high-speed rotation performance of the hollow structures 1 while improving the durability of the hollow structures 1, which are the bearing balls.

Furthermore, since the position of the center of gravity G1 of the main body part 10 of each of the hollow structure 1 substantially coincides with the position of the center of gravity G2 of the reinforcing part 20, the hollow structure 1 does not become eccentric. This makes it possible to further enhance the rotational performance of the bearing balls.

The above-described application example has discussed a case in which the hollow structure 1 of Embodiment 1 is applied to the rolling elements of the bearing 50. The hollow structure 1A of Embodiment 2 and the hollow structure 1B of Embodiment 3 may be applied to rolling elements of the bearing 50.

In addition, in the above-described application example, the bearing 50 including the hollow structure 1 is applied to the bearing member for the wind power generator, but the present invention is not limited to such an application example. Alternatively, the hollow structure 1 may be applied to, for example, a member that is used in an aircraft part or an electric vehicle part.

The present disclosure is not limited to each of the embodiments, but can be altered by a skilled person in the art within the scope of the claims. The present disclosure also encompasses, in its technical scope, any embodiment derived by appropriately combining technical means disclosed in differing embodiments.

The invention claimed is:

1. A hollow structure formed from ceramic, the hollow structure comprising:
    a main body part which has a spherical outer peripheral surface and in which a cavity is formed; and
    a reinforcing part which is formed integrally with the main body part on an inner peripheral surface of the main body part and which reinforces the main body part, the reinforcing part having a rib structure constituted by a plurality of ribs provided in a projecting manner on the inner peripheral surface of the main body part.

2. The hollow structure according to claim 1, wherein the center of gravity of the main body part substantially coincides with the center of gravity of the reinforcing part.

3. The hollow structure according to claim 1, wherein the reinforcing part has a structure having plane symmetry with respect to at least one cutting surface which passes through the center of gravity of the main body part.

4. The hollow structure according to claim 1, wherein the ceramic contains silicon nitride or silicon carbide.

5. A bearing member comprising the hollow structure according to claim 1,
    the hollow structure being a rolling element of the bearing member.

6. A method for producing a hollow structure, the hollow structure being formed from ceramic and comprising:
    a main body part which has a spherical outer peripheral surface and in which a cavity is formed; and
    a reinforcing part which is formed integrally with the main body part on an inner peripheral surface of the main body part and which reinforces the main body part, the reinforcing part having a lattice structure, a honeycomb structure, or a rib structure,
    the method comprising the step of forming, with use of a 3D printer employing fused deposition modeling, the main body part and the reinforcing part integrally with each other.

7. The method according to claim 6, comprising:
a molding step of molding, with use of the 3D printer, the main body part and the reinforcing part integrally with each other by layering a material in which ceramic is mixed in a resin;
a de-binding step of removing the resin from the main body part and the reinforcing part that have been molded in the molding step; and
a firing step of firing the main body part and the reinforcing part after the de-binding step.

* * * * *